(12) United States Patent
Liu et al.

(10) Patent No.: US 7,652,999 B2
(45) Date of Patent: Jan. 26, 2010

(54) METHOD AND APPARATUS FOR PROCESSING NULL PACKETS IN A DIGITAL MEDIA RECEIVER

(75) Inventors: Weixiao Liu, Indianapolis, IN (US); Ivonete Markman, Carmel, IN (US); Matthew Thomas Mayer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 605 days.

(21) Appl. No.: 10/560,480

(22) PCT Filed: Jun. 16, 2004

(86) PCT No.: PCT/US2004/019003

§ 371 (c)(1),
(2), (4) Date: Dec. 12, 2005

(87) PCT Pub. No.: WO2004/114676

PCT Pub. Date: Dec. 29, 2004

(65) Prior Publication Data

US 2006/0274737 A1    Dec. 7, 2006

Related U.S. Application Data

(60) Provisional application No. 60/479,397, filed on Jun. 18, 2003.

(51) Int. Cl.
*H04L 12/28* (2006.01)
*H04N 7/12* (2006.01)
*H04J 3/00* (2006.01)

(52) U.S. Cl. ............... 370/241; 370/476; 375/240.28

(58) Field of Classification Search .............. 370/230, 370/235, 241, 254, 476; 375/240.28
See application file for complete search history.

(56) References Cited

U.S. PATENT DOCUMENTS 5,414,833 A * 5/1995 Hershey et al. ............... 726/22

(Continued)

FOREIGN PATENT DOCUMENTS

CN    1287745 A    3/2001

(Continued)

OTHER PUBLICATIONS

Juan, Y., "Erroneous MPEG Packet Synchronization in FEC Decoder of the MCNS/SCTE/ITU-T J.83 Annex B Standard", 1998, pp. 372-373, IEEE, Digital Media Systems Laboratory, Hitachi America, Ltd., Princeton, NJ.

(Continued)

*Primary Examiner*—Kevin C Harper
*Assistant Examiner*—Wanda Z Russell
(74) *Attorney, Agent, or Firm*—Robert D. Shedd; Paul P. Kiel; Guy H. Eriksen

(57) ABSTRACT

A method and apparatus for reliably detecting MPEG-2 packet sync-byte positions received via a digital transmission system in the event of a packet stream containing a plurality of null packets of a plurality of packets containing a fixed repeating bit pattern and for reliably synchronizing and delivering the MPEG-2 stream broadcast to the receiver transport layer. A Null-Packet Detector compares the content of the current packet with a fixed (or predetermined) bit pattern to detect a null packet to reliably identify the location of the sync-byte of the null packet. a sync-byte position is identified based upon the position of the predetermined fixed bit pattern in the header portion of a plurality of null-packets in the stream.

36 Claims, 4 Drawing Sheets

U.S. PATENT DOCUMENTS

| | | | |
|---|---|---|---|
| 5,796,868 A * | 8/1998 | Dutta-Choudhury | 382/199 |
| 5,831,690 A | 11/1998 | Lyons et al. | |
| 6,710,814 B1 | 3/2004 | Ueno et al. | |
| 6,788,654 B1 * | 9/2004 | Hashimoto et al. | 370/321 |
| 6,810,084 B1 * | 10/2004 | Jun et al. | 375/240.28 |
| 7,245,664 B1 * | 7/2007 | Ohnami | 375/240.28 |
| 7,280,475 B2 * | 10/2007 | Tanaka et al. | 370/235 |
| 2003/0033025 A1 * | 2/2003 | Lee et al. | 700/5 |
| 2003/0115345 A1 * | 6/2003 | Chien et al. | 709/229 |
| 2004/0136352 A1 * | 7/2004 | Fu et al. | 370/341 |

FOREIGN PATENT DOCUMENTS

EP        0 933 949 A1      8/1999

OTHER PUBLICATIONS

Yujen Juan, Erroneous MPEG Packet Synchronization in FEC Decoder of the MCNS/SCTE/ITU-T J.83 Annex B. Standard, pp. 372 and 373.
EP Search Report.

* cited by examiner

METHOD AND APPARATUS FOR PROCESSING NULL PACKETS IN A DIGITAL MEDIA RECEIVER

This application claims the benefit, under 35 U.S.C. § 365 of International Application PCT/US2004/019003 filed Jun. 16, 2004, which was published in accordance with PCT Article 21(2) on Dec. 29, 2004 in English and which claims the benefit of U.S. provisional patent application No. 60/479,397 filed Jun. 18, 2003.

FIELD OF THE INVENTION

The present invention relates to transmitting and receiving multimedia data including digital video and audio, and more particularly to a method and apparatus for reliably synchronizing and delivering an MPEG-2 stream broadcast over such a digital transmission system to the receiver transport layer.

DESCRIPTION OF THE RELATED ART

Digital transmission systems offer consumers high-quality multimedia data including compressed audio and video streams. For broadcasters, the compression of data allows several programs to be delivered over the same analog bandwidth. The audio and video components of a program are compressed at the source and time-multiplexed with other programs and system information needed to recreate the original program. The digital multiplex is processed by a physical layer and transmitted to the consumer. At the consumer end, the receiver processes the signal to recover the multiplexed digital streams, extracts the program of interest, and decodes the compressed audio and video for presentation on a video/audio display such as a television.

To promote the development of interoperable components from different manufacturers, the MPEG-2 international compression standard was developed. The standard does not specify the techniques for encoding, multiplexing, and decoding the bit streams, but only the format of the data. This leaves an opportunity for manufacturers to differentiate their products through the way in which they use resources such as silicon, processor power, and memory, and through their ability to conceal or recover from errors. The standard is composed of three primary parts covering systems, video, and audio. The video and audio parts specify the format of the compressed video and audio data, while the systems part specifies the formats for multiplexing the audio and video data for one or more programs as well as information necessary for recovery of the programs.

The ANSI/SCTE 07 2000 (formerly SCTE DVS 031) and ITU-T J.83B standards, which are nearly identical, describe a digital transmission system for cable distribution of video, sound and data services. In particular, the ANSI/SCTE 07 2000 standard describes the adopted standard for digital cable transmission in the U.S. In both standards, the data format input to the physical layer (channel coding and modulation) is assumed to be MPEG-2 transport.

In the physical layer, the MPEG framing is the outermost layer of processing. At the transmitter, the MPEG framing block is followed by the Forward Error Correction (FEC) encoder and the 64 or 256 Quadrature Amplitude Modulator (QAM). An FEC system is a class of methods for controlling errors in a one-way communication system such as an MPEG-2 stream. An FEC encoder sends extra information along with the data, which can be used by the receiver to check and correct the data. The FEC encoder consists of concatenated systems including a Reed-Solomon (RS) encoder, an interleaver capable of several modes, a randomizer and a trellis encoder. It produces high coding gain at moderate complexity and overhead. The FEC system is optimized for quasi error free operation at a threshold output error event rate of one error event per 15 minutes. At the receiver, the corresponding functions of demodulation and FEC decoding are performed, followed by the MPEG framing block.

The MPEG framing processing block at the receiver delivers an MPEG-2 transport data stream consisting of a continuous stream of fixed length (188 bytes) packets that are transmitted in serial fashion, most significant bit (MSB) first.

The so-called "link" header of each packet contains fields for packet synchronization and identification, error indication, and conditional access. The subsequent adaptation header carries synchronization and timing information for decoding and presentation process. The payload (1496 bits) can contain any multimedia data including compressed video and audio streams.

The data packets of the MPEG-2 transport layer have 188 bytes, beginning with a four-byte transport packet header, the header having one byte for synchronization purposes (called sync byte and having a constant value of 47Hex), and three subsequent bytes containing service identification, scrambling and control information.

The four-byte transport packet header is followed by 184 bytes of MPEG-2 or auxiliary data. The transport packet header is as laid out in the following order:

a) Sync byte: 8 bits consisting of a fixed value of 0x47 (47Hex)

b) Transport_error_Indicator: 1 bit indicating an uncorrectable bit error in the current transport packet. This information may be set by the transmitter or the receiver.

c) Payload_unit_start_indicator: 1 bit indicating the presence of a new PES (Packetized Elementary Stream) packet or a new TS_PSI (Transport Stream-Program Specific Information) section.

d) Transport_priority: 1 bit indicating a higher priority than other packets.

e) PID: 13-bit packet ID. Values 0 and 1 are preassigned, while values 2 to 15 are reserved. Values 0x0010 to 0x1FFE may be assigned by the Program Specific Information (PSI). Value 0x1FFF is reserved for null packets.

f) Transport_scrambling control: 2 bits indicating the scrambling mode of the packet payload.

g) Adaptation_field_control: 2 bits indicating the presence of an adaptation field or payload data field.

h) Continuity_counter: 4 bits, representing one continuity-_counter per PID value. It increments with each nonrepeated transport stream packet having the corresponding PID value.

A broadcast MPEG-2 stream may contain several multiplexed programs of audio and video data, along with the necessary system data, and each packet of data is identified by a unique tag or PID within the packet header.

A section of the MPEG-2 data stream could be heavily biased in a particular PID, or evenly weighted across many PIDs, or could contain a high percentage of null packets. Errors, known and unknown, are inherent in transport stream delivery and can occur at any time. Unknown errors such as bit corruption or data loss can occur at any bit position of the stream, and may mislead the transport into unusual behavior.

The MPEG-2 sync byte is intended to facilitate packet delineation at a decoder. However, unlike many other digital transmission standards, the method used for MPEG-2 synchronization in the digital cable transmission system physical layer is de-coupled from the Forward Error Correction (FEC) synchronization. First, the MPEG-2 packet does not contain an integer number of FEC frames, or even Reed-Solomon (RS) codewords. Reed-Solomon (RS) Coding, using a (128, 122) code, provides block encoding and decoding to correct up to three 7-bit symbols within an RS block. Hence, the MPEG-2 packets and the FEC frames, or the MPEG-2 packets and RS codewords are asynchronous with respect to each other. Second, the sync byte is replaced inside the MPEG framing block at the transmission site by a parity checksum that is a coset of an FIR parity check linear block code.

Hence, the MPEG framing block at the receiver site needs to decode this parity check block code in order to recover the sync byte and then lock to it. It then delivers MPEG packet synchronization to the downstream receiver blocks, including the transport block. The output of this block may include an output clock, the data stream, in serial or parallel format, a sync signal identifying the position of the sync byte in the data stream, a valid signal identifying when data is present at the output data stream and an error signal identifying whether the packet is considered invalid (uncorrectable errors) or error free.

This synchronization de-coupling feature is incorporated as an additional layer of processing to make use of the information bearing capacity of the sync byte. At the transmitter, a parity checksum which is a coset of an FIR (finite impulse response) parity check linear block code (LBC or FIR-PCC) is substituted for this sync byte, for the purpose of improved packet delineation functionality, and error detection capability independent of the FEC layer. The parity checksum is computed over the adjacent 187 bytes, which constitute the immediately preceding MPEG-2 packet content (minus sync byte). The parity checks of the block code are computed at the receiver by observing the output of a finite impulse response (FIR), linear time-invariant (binary) filter. The parity check structure is based on a PN sequence generated by a (binary) primitive polynomial.

At the transmitter side, the checksum is computed by passing the 1496 payload bits through a linear feedback shift register (LFSR) as described by the following equation:

$$f(X)=[1+X^{1497}b(X)]/g(X), \text{ where } g(X)=1+X+X^5+X^6+X^8$$
$$\text{and } b(X)=1+X^3+X^7.$$

An offset of 67Hex is added to this checksum result for improved autocorrelation properties, and causes a 47Hex result to be produced during a syndrome decode operation when a valid code word is present. This structure allows for a computationally efficient implementation of the parity check FIR filter, in a recursive manner, that is generally self-synchronizing and therefore supports simultaneous packet synchronization and error detection. The decoder computes a sliding checksum on the serial data stream, using the detection of a valid code word to detect the start of a packet.

A parity check matrix is used by the decoder to identify a valid checksum. A syndrome generator may also be employed. The code has been designed such that when the appropriate 188 bytes of bitstream (including the checksum) are multiplied against the parity check matrix, a positive match is indicated when the calculated product produces a 47Hex result. (Note that the checksum is calculated based on the previous 187 bytes and not the 187 bytes yet to be received by the MPEG-2 sync decoder. This is in contrast to the conventional syntax of an MPEG packet, in which the sync byte is usually described as the first byte of a received packet.)

FIG. 1 is a block diagram depicting a prior art MPEG framing block 200 at the receiver end. The data stream is serialized and the Serial Data Stream is sent through the syndrome generator 210 which is specified in the ANSI/SCTE 07 2000 standard (see e.g., the syndrome generator illustrated at FIG. 3 of that standard). The syndrome detector 220 compares the output of the syndrome generator 210 with 47Hex for a number of packets, NP, and a programmable threshold, Synd_thresh, and establishes whether a sync byte has actually been detected. For example, if during NP packets, the number of syndrome outputs equal to 47Hex is greater than or equal to Synd_thresh, then a sync byte has been detected. A Lock_flag indicates whether or not the sync byte has been detected within the data stream, for example, by being a logic 1 or 0, respectively. A Sync_flag indicates the sync byte position within the data stream by, for example, being logic 1 during the sync byte and 0 otherwise. Once a locked alignment condition is established, the absence of a valid code word at the expected location will indicate a packet error. The Error_flag of the previous packet can then be set to 1; otherwise, the packet is considered error free and the Error_ flag is set to 0.

On a parallel path, the original Serial Data Stream is appropriately delayed (by Delay block 230) and sent to the MPEG sync re-inserter block 240 wherein the sync byte is re-inserted in place of the parity checksum (which was created at the transmitter MPEG framing block, not shown). Hence, the data stream output to the transport layer is a restored standard MPEG-2 transport stream. This data can be output in either serial or parallel mode. Two additional signals not shown in FIG. 1 are also sent to the transport layer: the clock and the valid or enable signal associated with the data.

The synchronization de-coupling feature of MPEG-2 was intended to introduce the flexibility, for example, to enable the system to carry Asynchronous Transfer Mode (ATM) packets easily without interfering with ATM synchronization. However, an unintended consequence of this feature is the increased probability of "false locks" in the syndrome detector of the prior art within the MPEG framing block in FIG. 1.

This happens because the parity check block code encoded in the transmitter side is not very powerful and its decoder (Syndrome generator 210) at the receiver end may indicate several places in a packet where a possible sync byte could be found, when only one is the correct one. This may occur even when the FEC is perfectly locked and delivers an error free data stream. Luckily, the typical data stream does not generally present a periodic characteristic and after being processed by the parity check block decoder, different packets will tend to have the correct sync positions in common. However, in the case of a periodic data stream, such as for example a data stream having a considerable number of null packets, this problem becomes acute and the sync lock Detector (Syndrome Detector 220) of the prior art may falsely lock to one of the several wrong sync byte positions in the packet as identified by the parity check block decoder and send invalid packets to the transport block even when the FEC is perfectly locked and delivers an error free data stream. As long as there are enough null packets multiplexed in the data stream on a regular basis, this may be enough to keep the lock detector falsely locked for a long time.

After a lock (synchronization) detection, the MPEG sync re-inserter 240 within the MPEG framing block of the prior art inserts the sync byte in the sync byte position identified by the parity check block decoder, outputs the Sync_flag signal, the Error_flag signal, the valid and clock signals, and sends the data stream to the transport layer. In the case of a false lock, the transport layer cannot easily identify a wrong packet, since it is receiving 188 data bytes, with a first byte expected to be the sync byte, a valid signal in line with the bytes, and error signal indicating an error free packet.

In broadcasting, the data stream may contain repetitive null packets, which may cause the Syndrome Detector 220 within the MPEG framing block of the prior art to lock to the wrong (synchronization) byte position, thereby producing invalid MPEG-2 packets output to the transport block even when the FEC is perfectly locked and delivers an error free data stream.

SUMMARY OF THE INVENTION

The present invention provides a method and apparatus for reliably detecting MPEG-2 packet sync-byte positions received via a digital transmission system in the event of a packet stream containing a plurality of null packets or a plurality of packets containing a fixed repeating data pattern and for reliably synchronizing and delivering the MPEG-2 stream broadcast to the receiver transport layer. A Null-Packet Detector circuit may be provided to compare the content of the current packet with a fixed (or predetermined) bit pattern to detect a MPEG-2 null-packet and to reliably identify the location of a checksum-encoded sync-byte within a null-packet. A sync-byte position is identified based upon the position of the predetermined fixed bit pattern in the header portion of one or a plurality of null-packets in the stream.

BRIEF DESCRIPTION OF THE DRAWINGS

The above features of the present invention will become more apparent by describing in detail exemplary embodiments thereof with reference to the attached drawings in which.

DESCRIPTION OF THE PREFERRED EMBODIMENTS

Figure 1:
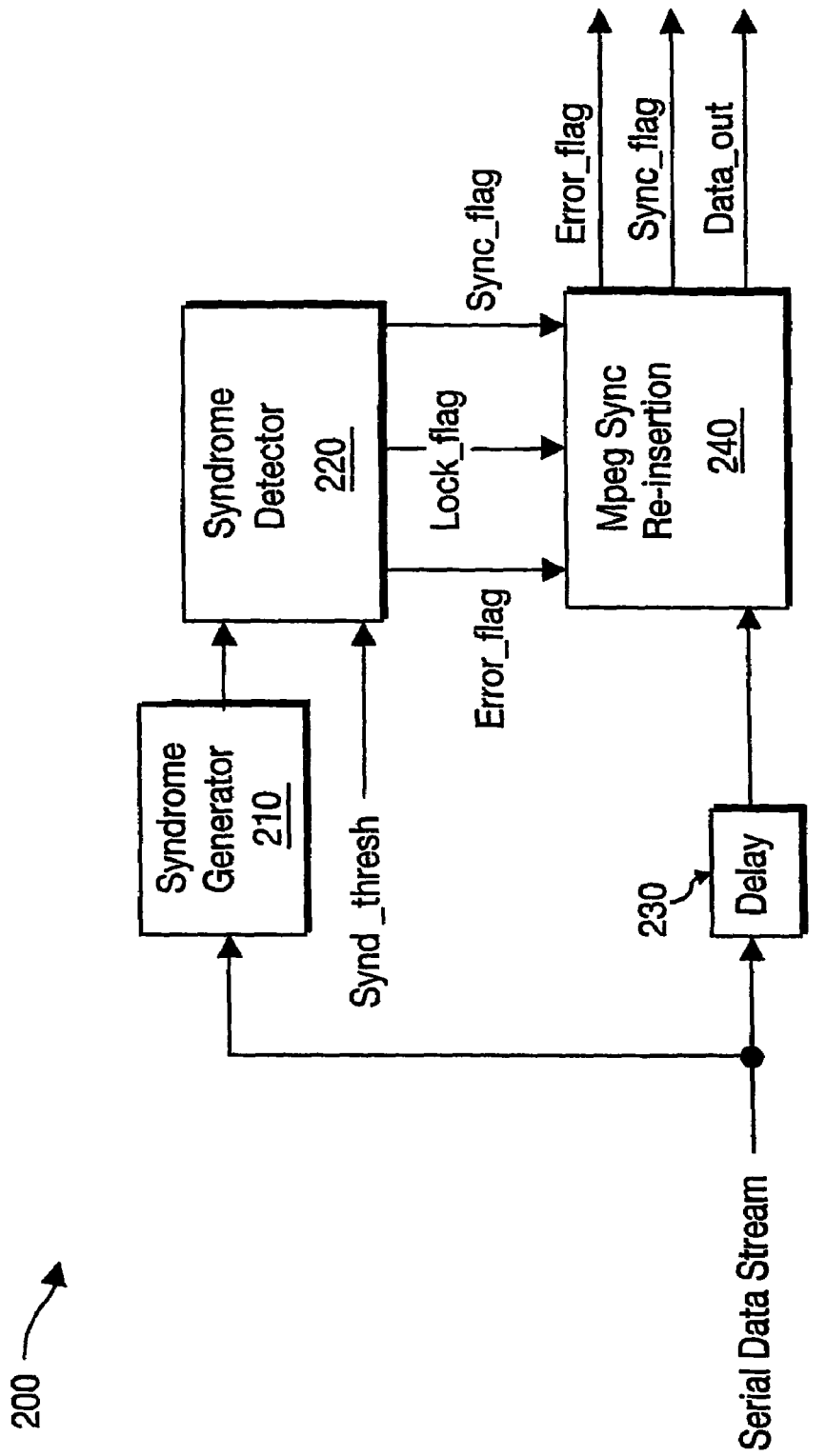
FIG. 1 shows a block diagram of a prior art MPEG framing block at the receiver end of a digital transmission system.
Figure 2:
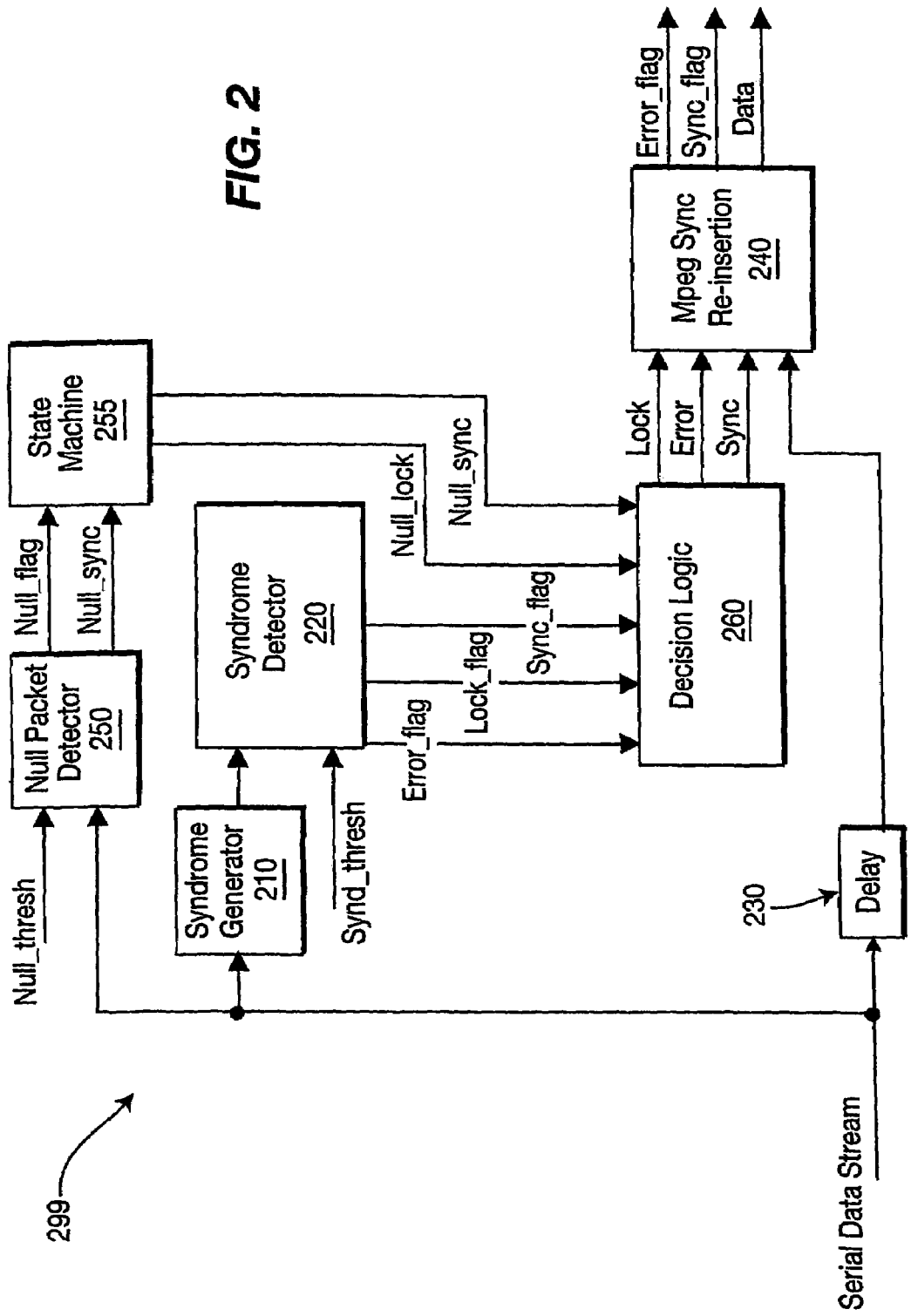
FIG. 2 is a block diagram of an MPEG framing block at the receiver end of a digital transmission system according to an embodiment of the present invention.

FIG. 2 is a block diagram of an MPEG framing block 299 at the receiver end of a digital transmission system according to an embodiment of the present invention. The MPEG framing block 299 of the present invention is similar to the MPEG framing block 200 of the prior art depicted in FIG. 1, but may comprise three additional blocks: the null packet detector 250, the state machine 255 and the decision logic block 260.

The null packet detector 250 detects null packets received in the Serial Data Stream.

Null packets usually have a predetermined preamble followed by a fixed data pattern (e.g., zeros). In a null packet the preamble contains specific bits within the packet header that are unique for a null packet. These are:

a) payload_unit_start_indicator='0'.
b) PID=0x1FFF
c) transport scrambling control='00'
d) adaptation field='01'

In some cases, null packets may also contain the predetermined preamble followed by payload data containing a predetermined data pattern (all zeros, or a sequence of bits other than all zeros).

The null packet detector 250 first detects the predetermined Null packet preamble (e.g., PID equal to 0x1FFFhex (8191 dec)) and, upon the detection of the predetermined Null packet preamble, begins to determine whether the subsequent data bits are equal to the expected (predetermined) fixed data pattern (e.g., a series of zeros). If the predetermined Null packet preamble is detected and the subsequent predetermined (fixed) data pattern is detected (e.g., equal to zero), then a null packet is considered to be "found" (detected).

In the alternative embodiments, (e.g., to increase the robustness of the null packet detection against noise and interference), the number of bits of difference (bit errors) between expected (predetermined) fixed data pattern and the received payload data is counted and the bit-difference (bit error) count is compared against a programmable threshold value, Null_thresh. If the preamble is detected but the number of non-matching bits (bit errors counted) is larger than Null_thresh, then the packet is not considered to be a null packet; otherwise, (if the preamble is detected) the packet is considered to be a null packet. Upon the detection of the predetermined Null packet preamble and subsequently counting a number of bits errors (e.g., ones where the predetermined data pattern is "all zeros") that is less than or equal to Null_thresh, the null packet detector will generate a "null-detect signal" (Null_flag). The Null_flag may be defined, for example, to be a logic "1", when a null packet is detected and logic "0", otherwise. In addition, the null packet detector 250 creates a Null_sync signal that indicates the position of the MPEG sync byte within the (null) packet (in the packet stream) as indicated by the detection of a null-packet's preamble and predetermined data pattern.

To increase detection reliability, the function of the null packet detector can be moderated by the low-pass filtering function of a hysteretic characteristic. A state machine 255 may be provided following the null packet detector 250 to enable the detection circuit to have a hysteretic characteristic that filters out higher frequency fluctuation in the selection of the sync byte position based on the output of the null detector 250. This feature may be implemented by counting during a predetermined or a programmable number of packets, Npackets1, whether the Null_flag is 1 for a count greater than or equal to a designated (or programmable) number of threshold packets, Lock_In_thresh, before declaring a null packet detector lock, (whereupon Null_lock is set to 1). On the other hand, once Null_lock is 1, the circuit counts occurrences of Null_lock being 0 during a programmable number of packets, Npackets0 (e.g., Npackets0=Npackets1=Npackets), to determine that the Null_flag has been 0 for a count greater than or equal to a designated (or programmable) number of threshold packets, Lock_Out_thresh, before declaring a loss of lock, (whereupon Null_lock is set to 0). In some embodiments, the programmable number of packets, Npackets0 and Npackets1, (representing the search "windows" spanning a number, e.g., Npackets of received packets) may be equal to the respective designated number of threshold packets, (Lock_Out_thresh and Lock_In_thresh), but will be preferably larger so that Null_lock is set to 1 (or reset to 0) when a selectable portion (e.g., three quarters) of received packets in a search window are null-packets (or are not null packets).

Other variations of the hysteretic characteristic are possible without loss of generality, and alternatively, the null packet detector 250 and the hysteretic characteristic function (of state machine 255) could be implemented by a microprocessor or ASIC.

The decision logic block 260 operates as follows: When the null packet detector 250 does not detect a null packet, (e.g., Null_sync=0 and Null_lock=0), the MPEG synchronization output (Sync), is generated by the checksum based synchronization detector (syndrome generator 210 and detector 220 blocks) as in the prior art (i.e., the sync byte position is indicated by the Sync_flag signal determined by the checksum-based detector 220). But, when null packets are detected, (and the Null_lock is 1), the MPEG synchronization is determined by the null packet detector 250, and its output Null_sync will be used as the MPEG synchronization output (Sync) to be used in the MPEG Sync Re-insertion block 240. The error output of the decision logic block 260 is the same as the Error_flag received from the Syndrome Detector 220. The Lock output of the decision logic is the Null_lock if Null_lock is 1, and is the Lock_flag if Null_lock is 0. The decision logic block 260 may be implemented as a circuit that effectively includes a multiplexor that multiplexes the conventional Sync_flag and the Null_sync signal output from the Null Detector 250, selecting one or the other, according to the selection method of the decision logic block 260 as explained above. In alternative embodiments of the invention, the function of the State Machine 255 (e.g., Hysteretic characteristic filter) may be merged with and incorporated into the decision logic block 260.

The remaining operative parts of the MPEG framing block 299 generally operate the same as in the prior art of FIG. 1.

In some embodiments of this invention, the null packet detector 250 of the MPEG framing apparatus (e.g., 299) may be comprised of a detector adapted to detect the predetermined preamble associated with a null-packet (or more simply, adapted to detect only the PID field equal to 0x1FFFhex (8191 dec)). In other embodiments of this invention, the null packet detector 250 may first detect the preamble and then proceed to check if the subsequent data bits (in the packet's payload) correspond to a fixed data pattern (e.g., a series of zeros, or all zeros) associated with a null-packet. In some embodiments of the invention, the (Null_flag) output of the null packet detector 250 is filtered (e.g., by a hysteretic function performed by a state machine 255) to produce a filtered output (Null_lock). In other embodiments of the invention, the output of the null packet detector 250 is unfiltered (See FIG. 3).

Figure 3:
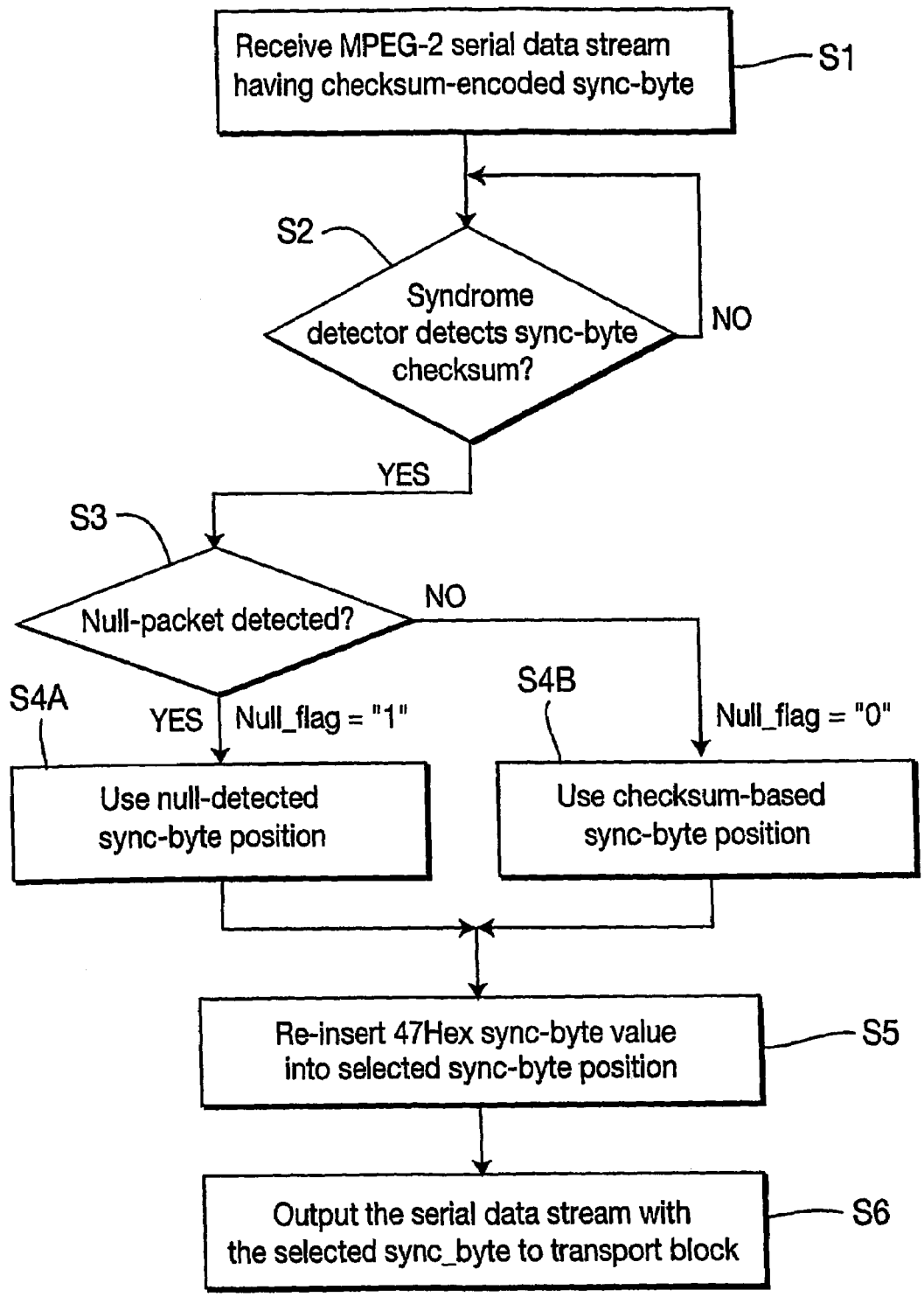
FIG. 3 is a flowchart that describes the method performed to determine the synchronization byte position in the event of null-packets according to an embodiment of the present invention.
Figure 4:
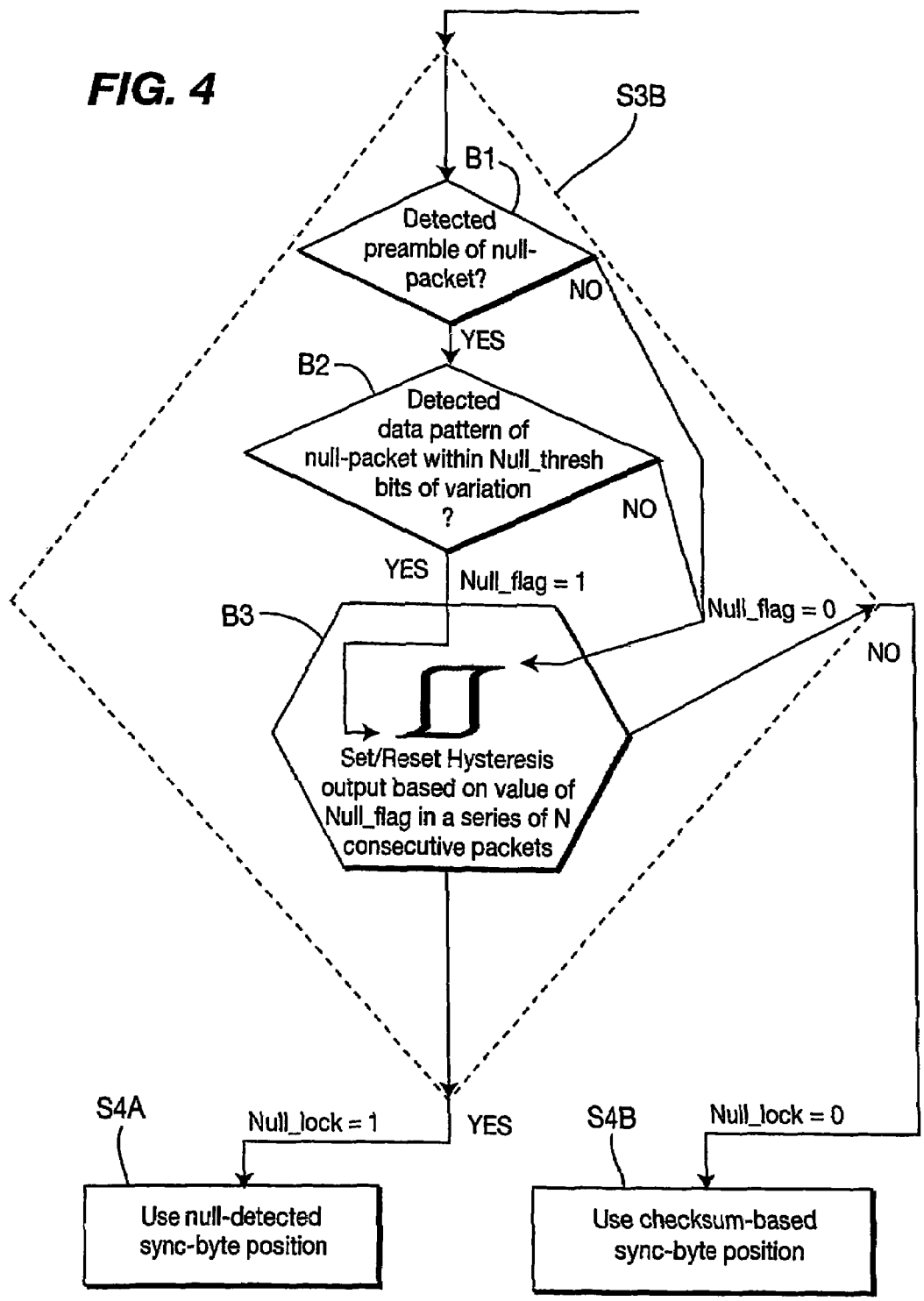
FIG. 4 is a flowchart that describes more precisely an algorithm used to detect a data stream containing null-packets in accordance with another embodiment of the present invention.

Operations of an MPEG framing block (e.g., 299 of FIG. 2) in accordance with embodiments of the invention are further described by referring to FIGS. 3 and 4.

FIG. 3 is a flowchart describing the general method performed to select the synchronization byte position according to an embodiment of the present invention. In step S1, a Serial Data Stream comprised of fixed-length (e.g., 188 byte) packets is received as digitally encoded (MPEG-2) signals conforming to a predetermined protocol (e.g., conforming to the ANSI/SCTE 07 2000 and ITU-T J.83B standards), the protocol defining multiple packet types (e.g., null-packets), each packet including a header portion (which can include a preamble identifying a packet as a null-packet) and a payload data portion, the header portion containing a checksum-encoded sync byte.

In Step S2, the received Serial Data Stream is sent through the syndrome generator which is specified in the ANSI/SCTE 07 2000 standard (see e.g., the syndrome generator illustrated at FIG. 3 of that standard) and then a syndrome detector 220 compares the output of the syndrome generator with the predetermined synchronization checksum to establish whether a (possible) sync byte has been detected.

If a sync byte is detected by the conventional checksum method performed in Step S2, then Step S3, and either one of Step S4A or Step S4B, and then Steps S5 and S6 are performed.

In Step S3 it is determined whether the presently received packet is a null packet. If the presently received packet is found to be a null packet, then a null flag (Null_flag) is set (e.g., to 1) and Step S4A and Steps S5 and S6 will be performed; If the presently received packet is not found to be a null packet, then the null flag (Null_flag) is reset (e.g., to 0)) and Step S4B and Steps S5, and S6 will be performed.

Next, in Step S5 the sync byte value (47hex) is re-inserted in the sync byte position selected by one of Steps S4A and S4B and in Step S6 the data stream containing the sync byte as restored above is output to the transport layer as a restored standard MPEG-2 transport stream.

FIG. 4 is a flowchart that describes more precisely an algorithm used to detect whether the data stream contains multiple null-packets, in accordance with another embodiment of the present invention.

Null-packet detection Step S3B is an alternative to the simpler null-packet detection Step S3 of FIG. 3 and can be performed by the Null Detector 250 and State Machine 255 of FIG. 2, and is comprised of Substeps B1, B2 and B3. If a sync byte is detected by the conventional checksum method (as performed in Step S2 of FIG. 3), then Step S3B is performed (and then either one of Step S4A or Step S4B, and then Steps S5 and S6 of FIG. 3 are performed).

In Sub-step B1, it is determined whether the presently received packet contains the predetermined preamble (e.g., including a PID equal to 0x1FFFhex (8191 dec)) associated with a null packet (e.g., in the header (PID) position as indicated by the checksum-based synchronization). If the predetermined Null packet preamble is detected (in the expected position) then a null flag (Null_flag) may be tentatively set (e.g., to 1) subject to the determination made in Substep B2, and Substep B2 is next performed. If the predetermined Null packet preamble (a first fixed bit pattern) is not detected (in the expected position) then a null flag (Null_flag) is reset (e.g., to 0) and that determination (Null_flag) is transmitted to the Hysteretic Characteristic Substep B3.

In Sub-step B2, it is determined whether the (subsequent) data payload of the presently received packet contain the predetermined fixed data pattern (a second fixed bit pattern, e.g., a series of zeros or all zeros). The bit-difference (error bit count) between the received data and the predetermined (fixed) data pattern is counted and is compared with a programmable threshold, Null_thresh. If the predetermined (fixed) data pattern is detected (e.g., data bits equal to zero or error-bit count is less than or equal to Null_thresh), then a null packet is considered to be "found" (detected) and the null flag (Null_flag) is set (e.g., to 1) and Substep B3 is next performed.

If the predetermined fixed data pattern (e.g., a series of zeros or all zeros) is not detected (within the Null_thresh threshold) then a null flag (Null_flag) is reset (e.g., to 0) and that determination (Null_flag) is transmitted to the Hysteretic Characteristic Substep B3. Thus, if the predetermined (fixed) data pattern is not detected (e.g., to many error bits are counted), then a null packet is considered to be not "found" (detected) and the null flag (Null_flag) is reset (e.g., to o) and Substep B3 is next performed.

In Substep B3 the Null_flag signal resulting from either of Substep B1 or B2 is filtered (e.g., by a hysteretic characteristic). This filtering can be implemented by a state machine (e.g., 255 of FIG. 2) reduce rapid fluctuations in the flag indicating a detection of a null packet (e.g., by the Null Detector 250 of FIG. 2) which is used to identify the true position of MPEG-2 sync bytes in the packets received via the Serial Data Stream. The details of performing such a hysteretic characteristic filter can be the same as those previously noted in connection with the above description of the operation of the State Machine 255 of FIG. 2, wherein the determined null packet status of a number (e.g., Npackets is greater than one) of packets are examined to determine the decision output of the state machine (to select the performance of either Step S4A or S4B of FIG. 3). The result of filtering Substep B3 is then used to select the performance of either Step S4A or Step S4B FIG. 3, and thereafter, Steps S5 and S6 will be performed.

An embodiment of the present principles may involve, for example, a computer program product for a set-top-box that comprises a set of instructions, which, when loaded into the set-top-box, causes the set-top-box to carry out the method, for processing a stream of fixed length packets, described herein above. Moreover, another embodiment of the present principles may involve, for example, a computer program product for a television set that comprises a set of instructions, which, when loaded into the television set, causes the television set to carry out the method, for processing a stream of fixed length packets, as described herein above.

Exemplary embodiments of the invention have been explained above and are shown in the figures. However, the present invention is not limited to the exemplary embodiments described above, and it is apparent that variations and modifications can be effected by those skilled in the art within the spirit and scope of the present invention. Therefore, the exemplary embodiments should be understood not as limitations but as examples. The scope of the present invention is not determined by the above description but by the accompanying claims, and variations and modifications may be made to the embodiments of the invention without departing from the scope of the invention as defined by the appended claims and equivalents.

The invention claimed is:

1. An apparatus, comprising:
   a Null-Packet Detector for processing a stream of fixed-length packets received by said apparatus as digitally encoded signals and having multiple packet types, each packet including a header portion and a data portion, the header portion including a sync byte,
   wherein said Null-Packet Detector processes the stream by detecting whether a received packet is a null-packet and for identifying the location of the sync-byte of a detected null-packet, and
   wherein the Null-Packet Detector further generates a first signal to indicate whether a received packet is a null-packet and generates a second signal to indicate the location of the sync-byte of a detected null-packet.

2. The apparatus of claim 1, further comprising a circuit adapted to insert a predetermined sync-byte value into the sync-byte position indicated by the second signal.

3. The apparatus of claim 1, further comprising a filter adapted to filter the first signal and adapted to generate a Null_lock signal a first value of which indicates that the stream contains a plurality of null packets.

4. The apparatus of claim 3 wherein the filter implements hysteresis thresholding.

5. The apparatus of claim 3 wherein the filter is implemented by a finite state machine.

6. The apparatus of claim 3, wherein the first value of Null_lock signal output by the filter indicates that the stream contains a first threshold number of null-packets (Lock_In_thresh) within a first number of consecutive packets.

7. The apparatus of claim 6, wherein at least one of the first threshold number and the first number of consecutive packets is programmable.

8. The apparatus of claim 6, wherein a second value of the Null_lock signal output by the filter indicates that the stream contains a second threshold number (Lock_Out_thresh) of packets that are not null packets, within a second number of consecutive packets.

9. The apparatus of claim 8, wherein at least one of the first threshold number, and the second threshold number is programmable.

10. The apparatus of claim 1, wherein the Null-Packet Detector determines whether a received packet is a null-packet by comparing contents of the header portion of the received packet with a first predetermined value.

11. The apparatus of claim 10, wherein the Null-Packet Detector determines whether a received packet is a null-packet by further comparing contents of the data portion of the received packet with a second predetermined value.

12. An apparatus comprising:
    a Syndrome Detector for processing a stream of fixed-length packets received by said apparatus as digitally encoded signals and having multiple packet types, each packet including a header portion and a data portion, the header portion including a checksum-encoded sync byte, the stream processed by detecting the checksum-encoded sync-byte and generating a Sync_flag signal to indicate the location of the checksum-encoded sync-byte;
    a Null-Packet Detector adapted to detect whether a received packet is a null-packet, and adapted to identify the location of the sync-byte of a detected null-packet; and
    an MPEG Sync-Byte Re-insertion circuit for inserting a predetermined value into the sync-byte location indicated by an MPEG synchronization signal.

13. The apparatus of claim 12, wherein the Null-Packet Detector is further adapted to output a Null_sync signal to indicate the location of the sync-byte of a detected null-packet.

14. The apparatus of claim 13, further comprising:
    a multiplexor, wherein the Sync_flag output of the Syndrome Detector and the Null_sync output of the Null-Packet Detector are multiplexed and are alternatively output by the multiplexor, to be used by the MPEG Sync-Byte Re-insertion circuit, according to whether null packets have been detected.

15. The apparatus of claim 14, further comprising a decisional logic circuit operatively connected to the multiplexor and adapted to control the multiplexor so that when the Null-Packet Detector detects null packets, the Null_sync output of the Null Packet Detector is output by the multiplexor to be used as the MPEG synchronization signal by the MPEG Sync-Byte Re-insertion circuit.

16. The apparatus of claim 13 adapted so that when null packets are detected, the Null_sync output of the Null Packet detector is used as the MPEG synchronization signal used by the MPEG Sync Re-insertion circuit.

17. The apparatus of claim 16, wherein when null packets are not detected, the Null_sync output of the Null Packet detector is not used as the MPEG synchronization signal used by the MPEG Sync Re-insertion circuit.

18. The apparatus of claim 17, wherein when null packets are not detected, the Sync_flag output by the Syndrome Detector is used as the MPEG synchronization signal used by the MPEG Sync Re-insertion circuit.

19. A method comprising:
    processing a stream of fixed length packets received by said method as digitally encoded signals, each packet including a checksum-encoded sync-byte, the stream including a plurality of packets that each contain a first fixed bit pattern in the header portion of each packet, wherein said processing step comprises:

performing a first detection step of decoding the checksum in the stream to detect a checksum-encoded sync byte position candidate in the current one of the fixed length packets;

performing a second detection step to detect the first fixed bit pattern in the header portion of the current one of the fixed length packets;

if the first fixed bit pattern is detected in the stream of fixed length packets, then identifying the sync-byte position of the sync-byte of each of the fixed length packets based upon the detection of the first fixed bit pattern; and inserting a predetermined sync-byte value into the identified sync-byte position.

20. The method of claim 19, wherein the second detection step is performed only if a checksum-encoded sync byte position candidate is detected in the first detection step.

21. The method of claim 19, wherein while the first fixed bit pattern is not detected in the stream of fixed length packets, then identifying the sync-byte position of the sync-byte of each of the fixed length packets in the stream based upon the result of the first detection step;

and inserting the predetermined sync-byte value into the sync-byte position candidate based upon the result of the first detection step.

22. The method of claim 19, wherein if a checksum-encoded sync byte candidate is detected in the first detection step, but the first fixed bit pattern is not detected by the second detection step, then inserting a predetermined sync-byte value into the sync-byte position candidate based upon the result of the first detection step.

23. The method of claim 19, wherein the second detection step is performed even if a checksum-encoded sync byte candidate is not detected in the first detection step.

24. The method of claim 19, wherein the first fixed bit pattern is a predetermined bit pattern in the header portion of each packet within the plurality of packets.

25. The method of claim 24, wherein said header portions comprise transport headers of an MPEG-2 Transport Stream.

26. The method of claim 19, wherein the first fixed bit pattern is a predetermined pattern that includes at least one of the following MPEG-2 transport stream link header field values: payload_unit_start_indicator ='0', PID=0x1FFF, transport scrambling control='00', and adaptation field='01'.

27. The method of claim 19, wherein each of the plurality of packets is an MPEG-2 null-packet.

28. The method of claim 19, wherein each packet in the plurality of packets that each contain a first fixed bit pattern in a header portion of each packet further contains a second fixed bit pattern within the data portion of each packet; and further comprising:

performing a third detection step to detect the second fixed bit pattern in the plurality of packets within the stream of fixed length packets, and if the second fixed bit pattern is detected in the stream of fixed length packets, then inserting the predetermined sync-byte value into the sync-byte position based upon the result of the third detection step.

29. The method of claim 27, wherein the third detection step is performed only if a checksum-encoded sync byte position candidate is detected in the first detection step.

30. The method of claim 27, wherein if neither of the first and second detection steps has identified a sync byte position, then no predetermined sync-byte value is inserted in the stream of fixed length packets.

31. The method of claim 27, wherein the third detection step is performed only if the first fixed bit pattern is detected in the stream of fixed length packets in the second detection step.

32. The method of claim 27, wherein if the second fixed bit pattern is not detected in the stream of fixed length packets, then identifying the sync-byte position of the sync-byte of each of the fixed length packets based upon the result of the first detection step.

33. A method comprising:

processing a stream of fixed length packets received by said method as digitally encoded signals, each packet including a checksum-encoded sync-byte, the stream including a plurality of packets that each contain a first data pattern in a PID portion, wherein said processing step comprises:

decoding the checksum in a preceding one of the fixed length packets to detect a checksum-encoded sync byte candidate in a current one of the fixed length packets; and if a checksum-encoded sync byte candidate is detected in the decoding step, then searching for the first data pattern in the PID portion of the current one of the fixed length packets.

34. An apparatus comprising:

means for processing a stream of fixed length packets received by said apparatus as digitally encoded signals, each packet including a checksum-encoded sync-byte, the stream including a plurality of packets that each contain a first data pattern in a PID portion, wherein said means for processing comprises:

means for decoding the checksum in a preceding one of the fixed length packets to detect a checksum-encoded sync byte candidate in a current one of the fixed length packets; and means for searching for the first data pattern in the PID portion of the current one of the fixed length packets when a checksum-encoded sync byte candidate is detected in the decoding step.

35. A computer program product for a set-top-box that comprises a set of instructions, which, when loaded into the set-top-box, causes the set-top-box to carry out the method, for processing a stream of fixed length packets, claimed in claim 19.

36. A computer program product for a television set that comprises a set of instructions, which, when loaded into the television set, causes the television set to carry out the method, for processing a stream of fixed length packets, claimed in claim 19.

* * * * *

UNITED STATES PATENT AND TRADEMARK OFFICE
CERTIFICATE OF CORRECTION

PATENT NO. : 7,652,999 B2
APPLICATION NO. : 10/560480
DATED : January 26, 2010
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this

Twenty-third Day of November, 2010

David J. Kappos
*Director of the United States Patent and Trademark Office*